US010217335B2

(12) United States Patent
Dunn et al.

(10) Patent No.: US 10,217,335 B2
(45) Date of Patent: Feb. 26, 2019

(54) DYNAMIC LINKING OF SECURITY SYSTEMS

(71) Applicant: Vivint, Inc., Provo, UT (US)

(72) Inventors: Alex J. Dunn, Orem, UT (US);
Christopher Lee Harris, Holladay, UT (US); Bruce Ehlers, Provo, UT (US);
Todd M. Santiago, Orem, UT (US);
James E. Nye, Alpine, UT (US);
Jeremy B. Warren, Draper, UT (US);
Jeffrey G. Thomas, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/449,979

(22) Filed: Mar. 5, 2017

(65) Prior Publication Data

US 2017/0243454 A1    Aug. 24, 2017

Related U.S. Application Data

(63) Continuation of application No. 14/211,188, filed on Mar. 14, 2014, now Pat. No. 9,589,453.
(Continued)

(51) Int. Cl.
*G08B 13/00* (2006.01)
*G08B 26/00* (2006.01)
*G06F 21/32* (2013.01)

(52) U.S. Cl.
CPC .............. *G08B 13/00* (2013.01); *G06F 21/32* (2013.01); *G08B 26/00* (2013.01)

(58) Field of Classification Search
CPC .... G08B 25/008; G08B 25/14; G08B 25/009; G08B 13/00; G06F 21/32
(Continued)

(56) References Cited

U.S. PATENT DOCUMENTS 6,868,493 B2   3/2005   Orlando et al.
7,113,090 B1   9/2006   Saylor et al.
(Continued)

FOREIGN PATENT DOCUMENTS

JP     10222774 A     8/1998

OTHER PUBLICATIONS

English abstract and English translation of the specification and claims for JP10222774. Aug. 21, 1998.
(Continued)

*Primary Examiner* — Naomi J Small
(74) *Attorney, Agent, or Firm* — Holland & Hart LLP

(57) ABSTRACT

The present disclosure relates to methods, systems, and apparatuses for dynamically linking a first security system and a second security system. A method may include selectively linking a first security system and a second security system based on one or more link conditions. The method may further include receiving one or more first sensor event messages from the first security system and sending at least a portion of the one or more first sensor event messages to the second security system. The method may also include receiving one or more second sensor event messages from the second security system, and sending at least a portion of the one or more second sensor event messages to the first security system. In one aspect, the method may include selectively de-linking the first security system and the second security system based on one or more de-link conditions.

20 Claims, 12 Drawing Sheets

Related U.S. Application Data

(60) Provisional application No. 61/793,609, filed on Mar. 15, 2013, provisional application No. 61/785,210, filed on Mar. 14, 2013.

(58) Field of Classification Search
USPC .................................................. 340/541, 517
See application file for complete search history.

(56) References Cited

U.S. PATENT DOCUMENTS

| | | | |
|---|---|---|---|
| 7,248,161 B2 | 7/2007 | Spoltore et al. | |
| 7,292,142 B2 | 11/2007 | Simon et al. | |
| 7,706,928 B1* | 4/2010 | Howell | G05B 19/0428 |
| | | | 700/295 |
| 7,825,796 B1* | 11/2010 | Simon | G05B 15/02 |
| | | | 340/286.02 |
| 7,836,209 B2 | 11/2010 | Addy | |
| 8,520,072 B1* | 8/2013 | Slavin | G08B 13/19684 |
| | | | 348/143 |
| 2003/0177372 A1* | 9/2003 | Orlando | G08B 25/008 |
| | | | 713/189 |
| 2003/0184436 A1* | 10/2003 | Seales | G08B 25/016 |
| | | | 340/531 |
| 2005/0253706 A1* | 11/2005 | Spoltore | G08B 25/008 |
| | | | 340/539.14 |
| 2006/0038691 A1 | 2/2006 | Bard | |
| 2006/0092010 A1* | 5/2006 | Simon | G08B 25/009 |
| | | | 340/521 |
| 2006/0103520 A1* | 5/2006 | Clark | G08B 25/08 |
| | | | 340/506 |
| 2006/0197661 A1 | 9/2006 | Tracy et al. | |
| 2012/0086572 A1 | 4/2012 | Tsai | |
| 2012/0098918 A1* | 4/2012 | Murphy | H04N 7/147 |
| | | | 348/14.01 |
| 2012/0126978 A1 | 5/2012 | Kellen et al. | |
| 2012/0257061 A1* | 10/2012 | Edwards | H04N 7/181 |
| | | | 348/153 |
| 2013/0057695 A1* | 3/2013 | Huisking | H04N 7/186 |
| | | | 348/156 |

OTHER PUBLICATIONS

International Search Report for PCT/US2014/028455. dated Jul. 14, 2014.

* cited by examiner

DYNAMIC LINKING OF SECURITY SYSTEMS

CROSS REFERENCE TO RELATED APPLICATION

This application is a continuation of U.S. patent application Ser. No. 14/211,188 entitled "Dynamic Linking of Security Systems," filed on Mar. 14, 2014, which claims the benefit of U.S. Provisional Patent Application No. 61/793,609 entitled "Linked Security Systems," filed on Mar. 15, 2013, and U.S. Provisional Patent Application No. 61/785,210 entitled "Security System Video and Image Functionality," filed on Mar. 14, 2013, which are assigned to the assignee hereof. The disclosures of each of which are incorporated by reference herein in their entireties.

TECHNICAL FIELD

This disclosure relates generally to security systems and, more specifically, to dynamically linking one or more separate security systems.

BACKGROUND OF RELATED ART

Security systems are widely used to protect property and to provide personal safety. Security systems generally include a control unit that controls the overall operation of the system, one or more keypads providing user access to the system, and various detectors and/or sensors.

Security systems may generate an alarm in response to any number of events, such unauthorized entry, fire, medical emergency or manual alarm activation. The security system may be associated with a service that remotely monitors the status of the security system. Thus, if the security system generates an alarm, a notification signal may be transmitted via a wired and/or wireless communications link to a central station. Upon receiving the notification, security service personnel at the central station may attempt to contact the property owner or other party at the facility to verify the alarm. If it is appropriate to do so, the security service representative may, upon confirmation of the alarm, contact an emergency response agency such as the police department, the fire department, an emergency medical team, or other appropriate entity.

One problem for many consumers is the need to monitor multiple security systems at separate facilities. A consumer may have one security system installed at home, and another at work. Another consumer may have one security system installed at his home, and a second at the home of an elderly parent or neighbor. While the consumer is at one facility, it may difficult to monitor the other facility without missing alerts or notifications.

BRIEF SUMMARY

Disclosed herein are systems, methods, and devices for dynamically linking security systems. In one implementation, a first security system includes a first control unit and a plurality of first sensors. A second security system includes a second control unit and a plurality of second sensors. The first control unit may be configured to link to the second control unit based upon the occurrence of one or more link conditions, such that the first control unit sends first system alarm condition messages for alarm conditions detected by the first sensors to the second control unit. The first control unit may also receive second system commands from the second control unit and execute the second system commands on the first security system. The second control unit may be configured to send the second system commands. The first control unit may also be configured to de-link with the second control unit of the second security system based upon the occurrence of one or more de-link conditions.

The first security system and the second security system may selectively link and de-link. The first control unit and the second control unit may, for example, automatically link in response to one or more link conditions, and automatically de-link in response to one or more de-link conditions.

In some embodiments, the second control unit may be configured to automatically link to the first control unit in response to one or more link conditions such that the second control unit sends second system alarm conditions for alarm conditions detected by the second system sensors to the first control unit. The second control unit may also receive first system commands from the first control unit and execute the one or more first system commands on the second security system. The second control unit may also be configured to automatically de-link to the first control unit in response to one or more de-link conditions.

The first security system may be installed at a first facility, and the second security system at a separate, second facility. The control units of the first and second security systems may send the alarm condition messages directly to each other, or indirectly through a monitoring system. The control units may also be configured to display the alarm condition messages they receive on their respective displays, and to visually or otherwise differentiate between the alarm condition messages displayed.

In some embodiments, the first and/or second security system may include a video conference module configured for establishing a video and audio communication session with at least one other electronic device. For example, the first control unit may include a video conference module configured for establishing a video and audio communication session with the second control unit of the second security system. Similarly, the second control unit may include a video conference module configured for establishing a video and audio communication session with the first control unit of the second security system. The first and/or second control unit may also include a communication interface for receiving and transmitting audio and video data over a network based the established video and audio communication session. In some embodiments, the video and audio communication session may be one-way, for example from the first control unit to the second control unit. In other embodiments, the video and audio communication session may be two-way, such that both the first and second control units can receive and transmit video and audio data to the other respective control unit.

In some embodiments, the first and/or second security system may include a camera configured to capture at least one image of an access area. The first and/or second security system may further include a control unit including a database. The control unit may be configured to compare data within the database to at least image captured by the camera and allow access to a premises if the data and the at least image adequately match. In one example, the first control unit of the first security system may link with the second control unit of the second security system to transmit data captured by a camera of the first security system.

Another embodiment may include a link module that links a first security system and a second security system. The link module may be configured to selectively link the first and second security systems based on one or more link conditions. The link module may be configured to receive first system sensor event messages generated by the first security system separate from the link module. The link module may also be configured to receive first system commands of the first security system. The link module may send second system sensor event messages generated by the second security system to the first security system and send second system commands of the second security system to the first security system, which may execute the second system commands. The link module may also be configured to selectively de-link the first and second security systems based on one or more de-link conditions.

The link module may be similarly configured to receive second system sensor event messages generated by the second security system and the second system commands. The link module may further send the first system sensor event messages generated by the first security system to the second security system, and send the first system commands to the second security system for execution.

The link module may be implemented in the second control unit, and a second link module may be implemented in the first control unit. The link module and second link module may communicate with each other. In other embodiments, the link module may be implemented in a monitoring system associated with the first security system and the second security system.

The link module may filter first system sensor event messages such that only a subset of the received first system sensor event messages is sent to the second security system. In one embodiment, the link module sends only sensor event messages associated with first system alarm condition messages to the second security system.

Also disclosed is a method for linking security systems. The method may include selectively linking a first security system and a second security system based on one or more link conditions. The method may further include receiving one or more first sensor event messages from the first security system and sending at least a portion of the one or more first sensor event message to the second security system that is separate from the first security system. The method may also include receiving one or more second sensor event messages from the second security system and sending at least a portion of the second sensor event messages to the first security system.

In some embodiments, a method for linking security systems may include displaying on a second control unit for the second security system at least a portion of the one or more first sensor event messages received from the first security system. In some cases, the method may include displaying on a first control unit for the first security system at least a portion of the one or more second sensor event messages received from the second security system. Some embodiments may include sending one or more first commands for the second security system, which first commands originate with the first security system, to the second security system.

Some embodiments may include capturing at least one image of an access area of a security system and comparing the at least one image to stored data. The method may also include granting access to a secured area if the at least one image adequately matches the stored data.

In another specific embodiment, a method may include retrieving a first network address at a communication device of a security system and establishing a video communication link with a second communication device assigned the first network address.

Yet another embodiment of the present disclosure comprises a computer-readable media storage storing instructions that when executed by a processor cause the processor to perform instructions in accordance with one or more embodiments described herein.

Other aspects, as well as features and advantages of various aspects, of the present disclosure will become apparent to those of skill in the art though consideration of the ensuing description, the accompanying drawings and the appended claims.

DETAILED DESCRIPTION

Figure 1:
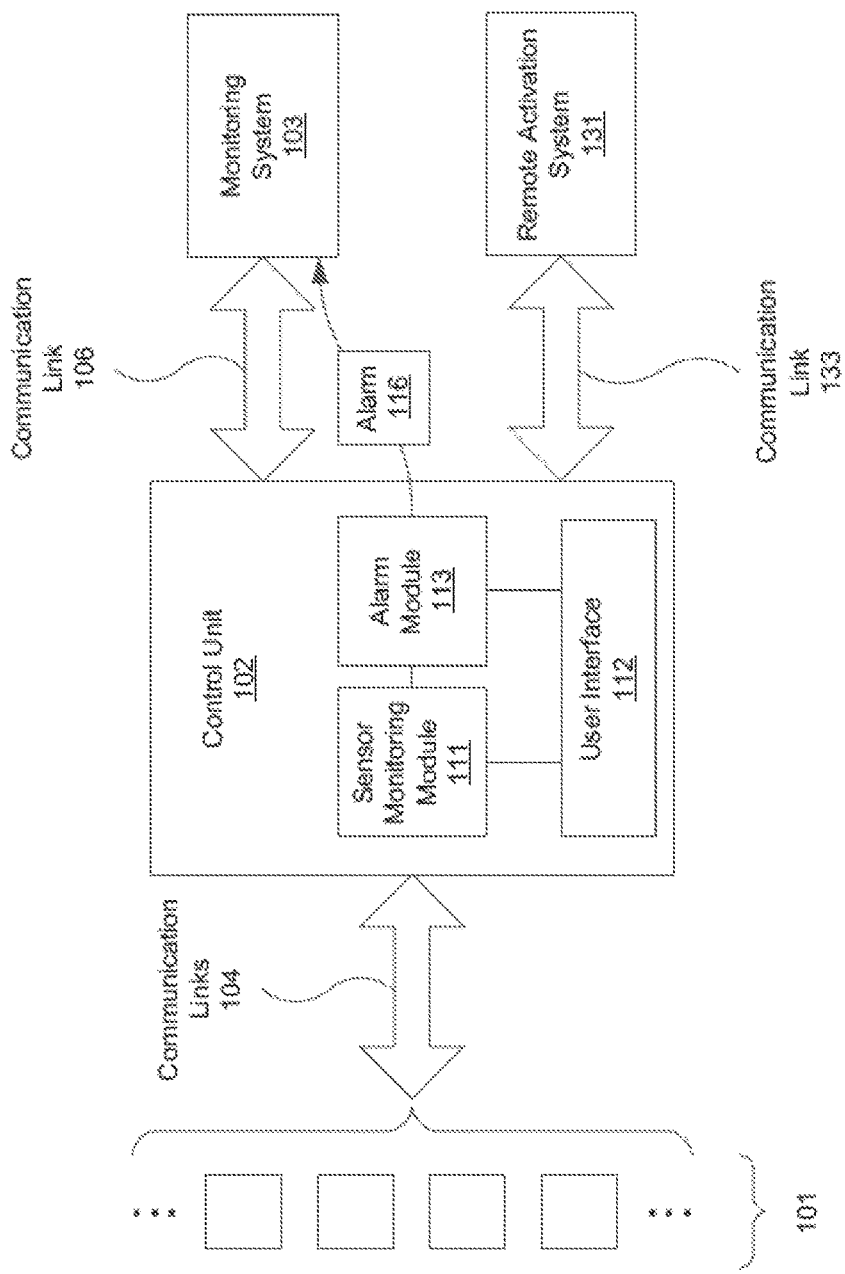
FIG. 1 illustrates an embodiment of a security system.

Referring in general to the accompanying drawings, various embodiments of the present disclosure are illustrated to show the structure and methods for installing a component within a system, such as a security system. Common elements of the illustrated embodiments are designated with like numerals. It should be understood that the figures presented are not meant to be illustrative of actual views of any particular portion of the actual device structure, but are merely schematic representations which are employed to more clearly and fully depict embodiments of the disclosure.

The following provides a more detailed description of ways to implement the present disclosure and various representative embodiments thereof. In this description, functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other solutions. For the most part, details concerning timing considerations and the like have been omitted where such details are not necessary to obtain a complete understanding of the present disclosure and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

According to various embodiments of the present disclosure, systems, methods, and devices are provided for dynamically linking security systems. A first security system may include a first control unit and a plurality of first sensors. A second security system may include a second control unit and a plurality of second sensors. The first control unit may be configured to link to the second control unit based upon the occurrence of one or more link conditions, such that the first control unit sends first system alarm condition messages for alarm conditions detected by the first sensors to the second control unit. The first control unit may also receive second system commands from the second control unit and execute the second system commands on the first security system. The second control unit may be configured to send the second system commands. The first control unit may also be configured to de-link with the second control unit of the second security system based upon the occurrence of one or more de-link conditions.

The first security system and the second security system may selectively link and de-link. The first control unit and the second control unit may, for example, automatically link in response to one or more link conditions, and automatically de-link in response to one or more de-link conditions.

According to various embodiments of the present disclosure, a security system may include a control unit, which may be configured for establishing a video and audio communication session with at least one other electronic device. For example, in one embodiment, a control unit of a first security system may establish a video and audio communication session with a control unit of another security system. In another embodiment, a first control unit (e.g., a primary control panel) of a security system may establish a video and audio communication session with another panel (e.g., a secondary control panel) within the security system. In another embodiment, a control unit of first security system may be configured to establish a video and audio communication session with a remote computing device, such as a mobile telephone.

In accordance with other various embodiments of the present disclosure, a security system may include a camera positioned at an access area (e.g., outside of a residence and near a door) and configured to record and/or display video of the access area. In one example, a control unit may be configured to display live video (i.e., video captured by the camera) of the access point on a display device of the control unit (e.g., inside a residence). In another example, video taken by the camera may be recorded by the control unit (e.g., a digital video recorder (DVR)) for subsequent viewing. According to one embodiment, recording of events (i.e., via the camera) may triggered be based on security system events (e.g., if a door unlocks, if a window breaks, or if the camera senses movement). In some embodiments, the live or recorded video information gathered by the camera may be sent to a control unit of another security system, for example, upon the occurrence of a link condition that causes the two security systems to automatically link.

Further, according to other embodiments of the present disclosure, a security system may include a camera proximate an access area and configured to capture at least one image of the access area. The security system may further be configured to process the at least one image captured by the camera to compare the at least one image to data (e.g., images) stored in a local database to determine whether access to an area (e.g., a residence) should be granted to a person depicted in the image. In some embodiments, the live or recorded video information gathered by the camera may be sent to a control unit of another security system, for example, upon the occurrence of a link condition that causes the two security systems to automatically link, to enable the user of the linked security system to influence the access determination.

As noted above, a security system may include one or more sensors linked to a control panel, which may include an interface that can be used by a user. It is noted that a "control panel" may also be referred to herein as a "control unit" or a "system controller." Via a control panel, a user may arm (e.g., when leaving their residence) and disarm (e.g., when entering their residence) the security system. The control panel may provide other functionality, such as a physical duress alarm, two-way voice communication, a siren, etc. Security sensors may be configured to monitor for various events. For example, a door/window sensor may be configured to detect when a door/window has been opened, a motion detector may be configured to detect motion. Other sensors may be configured to detect breaking of glass.

In addition to a local control panel, which monitors sensor activity on premises, a security system may include a central monitoring system. For residential security systems, a remote central monitoring system can be a third party vendor's in some cases, the same company that installed the alarm system. For commercial and industrial security systems, security or other personnel may monitor the premises. In commercial and industrial settings, the control panel can be integrated into a larger security system. In any event, when sensor monitoring is activated and a sensor indicates a physical disturbance, the control panel can activate an alarm. In response to an alarm, the control panel can activate an audible siren and/or send an indication of the alarm to a central monitoring entity via a security event signal. The central monitoring entity can then initiate a response, such as contacting the owner of the premises, sending security personnel, contact authorities, or a combination thereof.

FIG. 1 illustrates an embodiment of a security system 100, which may also be referred to as an "alarm system." The security system 100 includes sensors 101, a control unit 102, monitoring system 103, and remote activation system 131. Communication links 104 (which may be a combination of wired and wireless communication links) couple sensors 101 to control unit 102. Wired communication links can include circuit loops that are either detected as closed or open. In some embodiments, sensors 101 and control unit 102 are located in the same facility, such as in the same residence or in the same building. Communication link 106 (which may be a wired telephone connection, wired or wireless network connection, cellular connection, etc., or combination thereof) may couple the control unit 102 to monitoring system 103. In other embodiments, the system shown in FIG. 1 may be implemented without a monitoring system 103. In certain embodiments, the monitoring system 103 may communicate with multiple control units 102 belonging to other security systems.

Sensors 101 monitor for certain events and report relevant events to the control unit 102. Sensors 101 may include any of a variety of different types of sensors, such as door and window sensors, motion sensors, glass break sensors (e.g., sensors that detect a physical break or detecting the sound of a glass break), etc. The control unit 102 may be configured to monitor sensors 101 for events or alarm conditions via communication links 104 and to relay alarms to the monitoring system 103 via communication link 106. The sensors 101 may, in response to detecting an alarm condition, send an alarm condition message to the control unit 102.

Control unit 102 may include sensor monitoring module 111, user interface 112, and alarm module 113. Sensor monitoring module 111 is configured to monitor sensors 101. Sensors 101 can sense and/or indicate a change in their physical surroundings (e.g., a normally closed connection becomes open, a signal indicating that the sound of breaking glass was detected, etc.) which may be indicative of an unauthorized access, fire, or other event. The sensors 101 may communicate messages on communication links 104. For example, a circuit connected to a door sensor can transition from closed to open (or to a resistance exceeding a pre-determined resistance threshold) indicating that a door has been opened. A motion sensor 101 can send an electrical signal indicative of detected motion. Sensor monitoring module 111 may monitor communication links 104 for alarm condition messages sent from sensors 101. Upon sensor monitoring module 111 receiving an alarm condition message indicating the occurrence of an alarm condition, sensor monitoring module 111 may send a signal to alarm module 113. The alarm module 113 may determine whether an alarm condition has actually occurred before communicating with the monitoring system 103.

User interface 112 can include an input interface and an output interface. The input interface can comprise a physical input interface or virtual input interface that may include a numeric key pad (e.g., for entering a disarm code, etc.), sensor activation buttons, physical duress buttons, or other input/output devices. The input interface can include a condenser for receiving audio input and/or communicating with monitoring system 103. The output interface may include an output display device that displays system status, such as armed and disarmed, sensors/zones that have detected change in physical surroundings, and other relevant information. The output interface can also include a speaker that audibly outputs information similar to that displayed on the output display device. The speaker can also be used by monitoring system 103 to communicate with a user of control unit 102. Other input/output approaches may also be implemented as part of the user interface 112.

The control unit 102 may also communicate over a communication link 133 with a remote activation system 131. The remote activation system 131 may allow a user to interact with the control unit 102 remotely. For example, the user may be able to arm and disarm the system 100 from a mobile device such as a cellular phone using the remote activation system 131.

In some instances, the control unit 102 may be configured to automatically link and delink with another control unit of another security system separate from security system 100, in response to one or more link/de-link conditions, as will be described in greater detail below.

Figure 2:
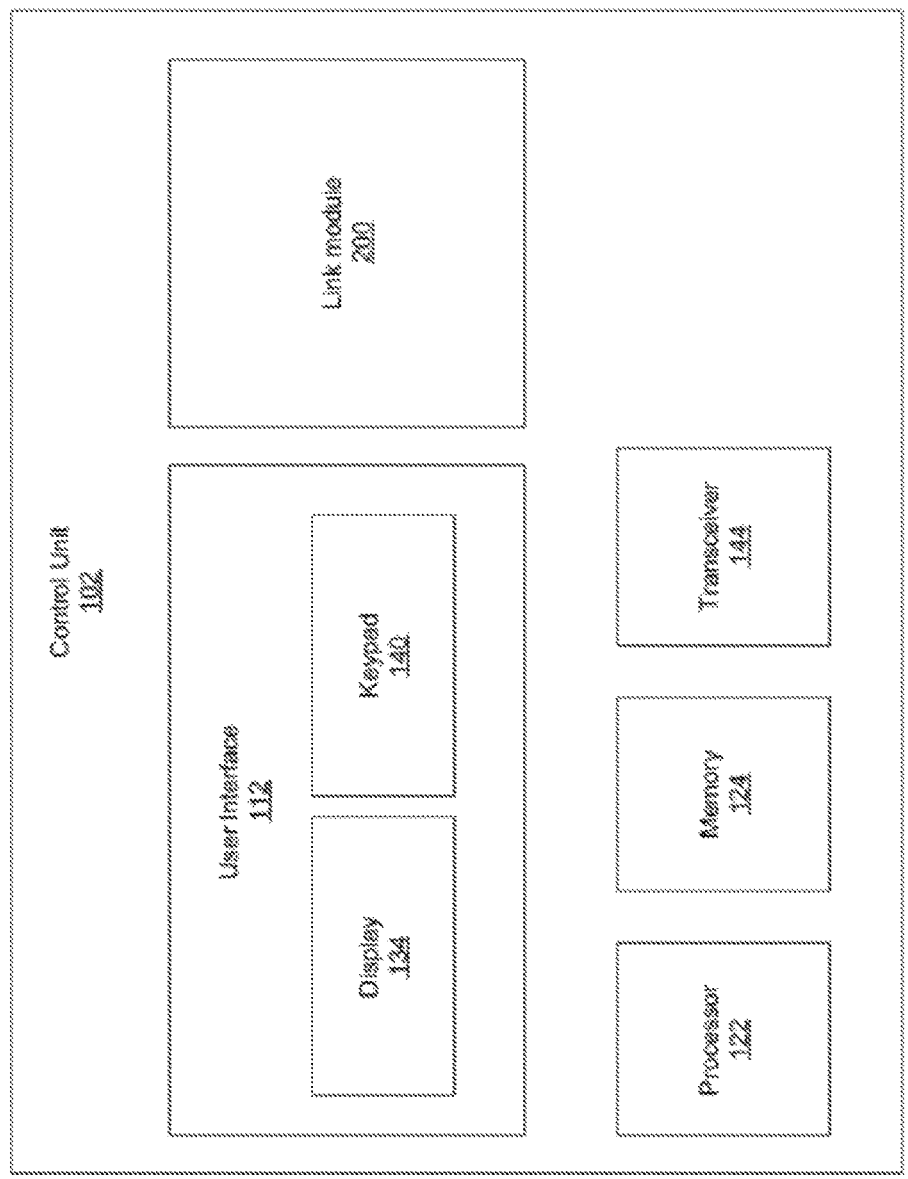
FIG. 2 is a block diagram of an embodiment of a control unit of a security system.

FIG. 2 is a block diagram of one embodiment of a control unit 102. Control unit 102 may include a processor 122, memory 124, transceiver 144, and user interface 112. User interface 112 may include various input/output (I/O) devices, such as a display 134, which may comprise a touch screen, and keypad 140. Control unit 102 may further include a transceiver 144 for receiving and transmitting data over a network. It is noted that a "communication interface" as referred to herein may comprise transceiver 144 and user interface 112. The control unit 102 may be capable of communicating over more than one network; for example, the control unit 102 may be capable of communicating with a radio frequency identification (RFID) tag, a wireless Internet network, a cellular network, and others.

Generally, control unit 102 may operate under control of an operating system stored in memory 124, and interface with a user to accept inputs and commands and to present outputs through user interface 112. Control unit 102 may also implement a compiler (not shown) which allows one or more application programs (not shown) written in a programming language to be translated into processor 122 readable code. Instructions implementing an application program may be tangibly embodied in a computer-readable medium. Further, an application program may include instructions which, when read and executed by processor 122, cause processor 122 to perform the steps necessary to implement and/or use embodiments of the present disclosure. It is noted that an application program and/or operating instructions may also be tangibly embodied in memory 140 and/or data communications devices, thereby making a computer program product or article of manufacture according to an embodiment the present disclosure. As such, the term "application program" as used herein is intended to encompass a computer program accessible from any computer readable device or media. Furthermore, portions of the application program may be distributed such that some of the application program may be included on a computer readable media within control unit 102, and some of the application program may be included in a remote device, such as a remote computer.

The control unit 102 may thus be a component in a security system and/or a building automation system. The control unit 102 may provide security and/or automation functionality for a residence, an office, a building, or other appropriate space.

In some embodiments, the control unit 102 may be realized as a control panel. As used herein, the term "control panel" refers to a standalone, dedicated unit for providing security and/or building automation functionality. The term "control panel" does not include a general purpose computer, smart phone, tablet, or other general purpose device that may run an application providing some security/automation functionality.

The control unit 102 may further include a link module 200. The link module 200 may be software, firmware, hardware, or a combination thereof. While FIG. 2 illustrates the link module 200 as a component of the control unit 102, the link module 200 may, in other embodiments, be implemented separate from the control unit 102. In one embodiment, illustrated in FIG. 5, the link module 200 is implemented as part of a monitoring system 103 providing services for multiple security services. The link module 200 links a first security system and a second security system; in certain embodiments, each security system can be monitored and/or controlled from the other security system. For example, the link module 200 may link a security system installed in a home with a security system installed in an office, allowing a user to monitor and manage the security system installed at the office from the security system installed in the home. The link module 200, for example, may automatically link and de-link the two security systems upon the occurrence of one or more link/de-link conditions.

Figure 3:
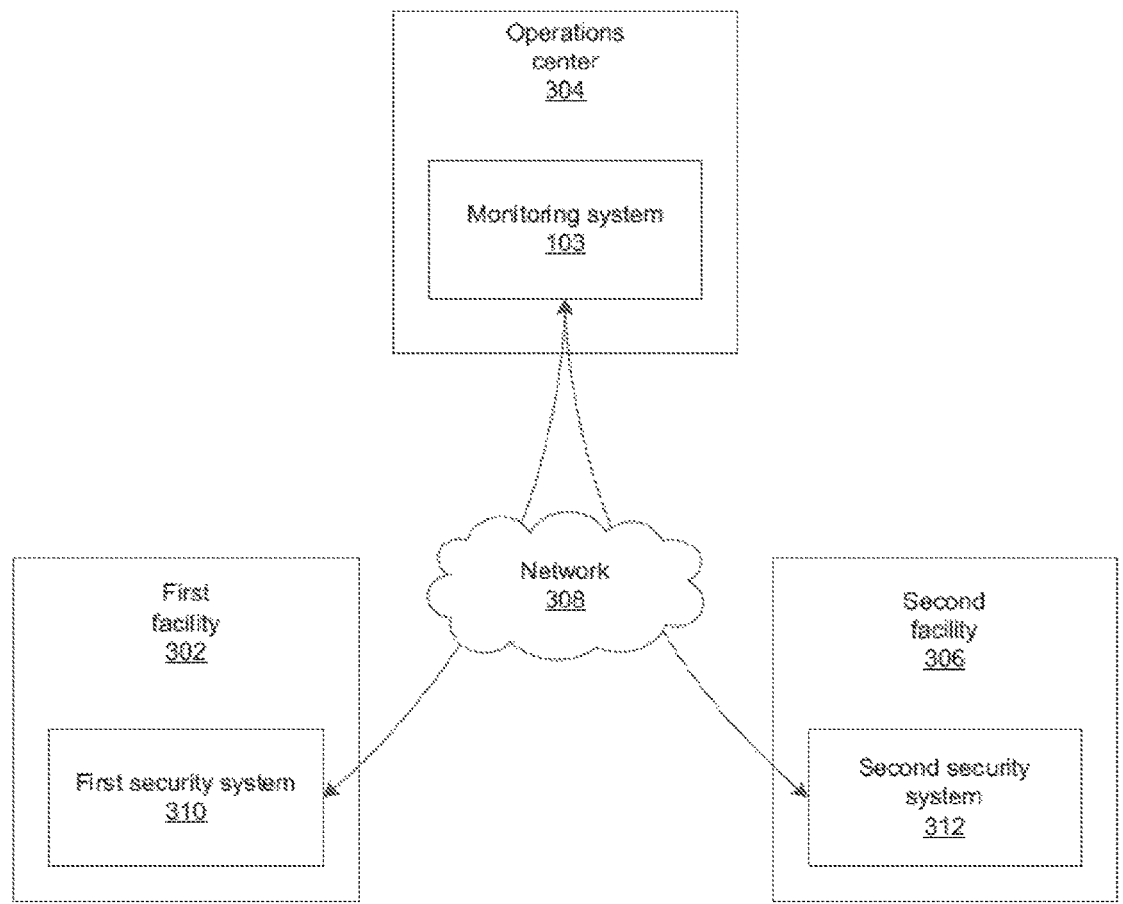
FIG. 3 is a schematic block diagram illustrating one embodiment of a system including a first facility, an operations center, and a second facility.

FIG. 3 illustrates one embodiment of a system 300 including an operations center 304, a first facility 302, and a second facility 306. A facility, as used herein, refers to a physical location, and typically includes one or more structures. The first facility 302 may be a residence, and the second facility 306 may be a business office. The first facility 302 may be a business office and the second facility 306 a construction site. The first facility 302 and the second facility 306 may both be residences. Facilities other than those given in the examples above may also be beneficially linked as described herein.

The system 300 includes an operations center 304 implementing a monitoring system 103. While FIG. 3 illustrates an operation center 304 implementing the monitoring system 103, the monitoring system 103 may, in certain embodiments, be implemented without an associated operations center 304. The operations center 304 provides systems and/or personnel that support the security functions of the security system implemented at the facility 302. For example, the control unit 102 may communicate with a monitoring system 103 in the event of an alarm condition at the facility 302. A security representative situated at the operations center 304 may review the alarm condition notifications communicated to the monitoring system 103. The security representative may attempt to contact an individual associated with the first facility 302 by phone, through the first security system 310, or other. In appropriate circumstances, the individual may contact an emergency response center and dispatch emergency response personnel to the first facility 302. In other instances, the monitoring system 103 may automatically respond according to preset instructions to certain alarm conditions.

For example, the first security system 310 may send the monitoring system 103 an alarm condition notification indicating that a fire alarm at the first facility 302 has been triggered. The security representative at the operations center 304 may review the alarm condition notification sent to the monitoring system 103 and attempt to contact a person at the first facility 302. After confirming that there is a fire at the first facility 302, the security representative may call 9-1-1 and ask that firefighters be dispatched to the first facility 302. The operations center 304 may provide a similar service for the second facility 306. The monitoring system 103, for example after confirming the fire alarm at the first facility, may automatically notify fire personnel to respond to fire alarm at the first facility 302.

The system 300 also includes a network 308. The network 308 communicatively couples the first security system 310 of the first facility 302 with one or more separate devices, such as the monitoring system 103. The network 308 also, in the depicted embodiment, couples the second security system 312 of the second facility 306 with the monitoring system 103. The network 308 may be an Internet network, a telephone network, a cellular network, or other variety of communications network. In certain embodiments, the first security system 310 and the second security system 312 may be configured to connect with more than one network 310; such an embodiment may provide redundancy and make the system 300 more robust.

The first facility 310 includes a first security system 310. The first security system 310 provides security services for the first facility 302. The first security system 310 may also provide additional services, such as home automation services (like managing light and temperature), for the first facility 302. The first security system 310 may include sensors and control panels as depicted in FIGS. 1 and 2. The second security system 312 may provide comparable services for the second facility 306.

Beneficially, the first security system 310 of the first facility 302 and the second security system 312 of the second facility 306 may be linked. A link module 200 may provide the link functionality for the system 300. The first security system 310 may share information with the second security system 312, and vice versa. As a result, an individual moving between the first facility 302 and the second facility 306, or a person responsible for the security of both the first facility 302 and the second facility 306, may more easily manage security at both locations.

Figure 4:
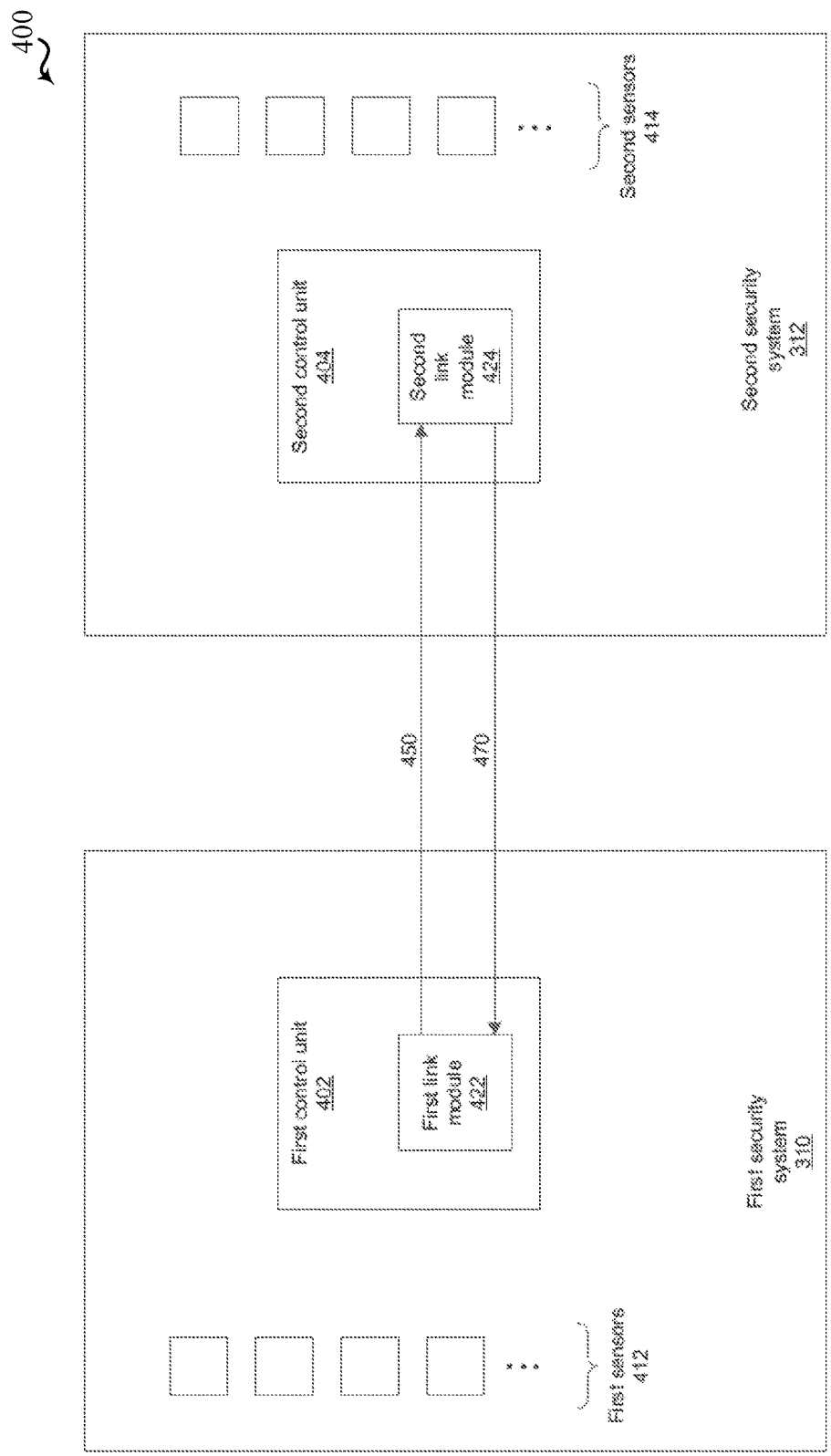
FIG. 4 is a schematic block diagram illustrating a first and second security system with respective control units implementing link modules.

FIG. 4 illustrates one embodiment of a first security system 310 and a second security system 312 that are linked. The first security system 310 includes a first control unit 402 and first sensors 412. The first sensors 412 may provide information to the first control unit 402 as described above. The first sensors 412 may detect one or more alarm conditions and send one or more alarm condition messages to the first control unit 402. As used herein, an alarm condition refers to a condition detected by at least one of the first sensors 412, which may be examples of sensors 101 described above in reference to FIG. 1, that may indicate a potential alarm. For example, a window being opened and a smoke detector detecting smoke are both examples of alarm conditions. The alarm condition need not always trigger an alarm; an open window may be an alarm condition detected by a sensor 101, 412, but if the security system is not armed, the open window may not trigger an alarm.

An alarm condition message refers to a communication indicating the occurrence of an alarm condition. For example, a sensor 101, 412 may send an alarm condition message to the first control unit 402 upon occurrence of an alarm condition. Similarly, the first control unit 402 may send an alarm condition message to a monitoring system 103 and/or a second control unit 404. The formatting and content of an alarm condition message may change depending on the device sending and the device receiving the alarm condition message. For example, the alarm condition message sent by a first sensor 412 to the first control unit 402 may be sent according to the Z-Wave wireless communications protocol. The alarm condition message sent by the control unit 402 to the monitoring system 103 may be sent according to the hypertext transfer protocol (HTTP), and may include additional and/or different information than the alarm condition message sent by the first sensor 412.

Figure 5:
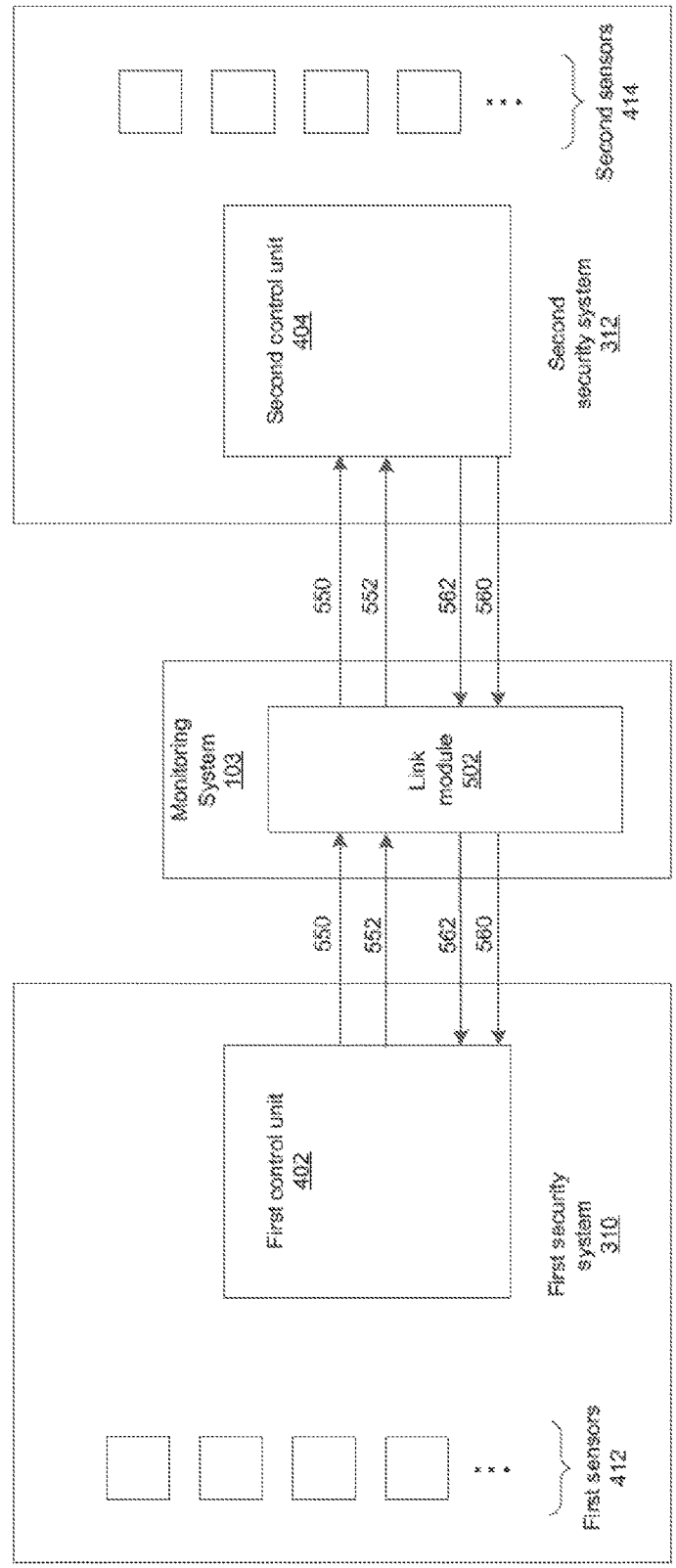
FIG. 5 is a schematic block diagram illustrating a link module implemented in a monitoring system and linking a first security system and a second security system.

The first control unit 402 may be configured to link to the second control unit 404. The first control unit 402 may, as shown in FIG. 4, link directly to the second control unit 404. For example, the second control unit 404 may be an Internet-enabled device with a unique address. The first control unit 402 may be configured to send messages to the address associated with the second control unit 404. In other embodiments, as shown in FIG. 5, the first control unit 402 communicates indirectly with the second control unit 404. For example, the first control unit 402 may send messages to a monitoring system 103. The monitoring system 103 may then send those messages to the second control unit 404, or make those messages available for retrieval by the second control unit 404.

The first control unit 402 may be configured to send, to the second control unit 404, one or more first system alarm condition messages 450 (i.e., alarm condition messages for the first security system 310) for alarm conditions detected by the first sensors 412. For example, if a first sensor 412 detects an open door and the first control unit 402 determines that the first security system 310 is armed, the first control unit 402 may cause an alarm to sound at the first facility 302 and send an alarm condition message 450 to the second control unit 404 indicating that the door is open and that the second control unit 404 has sounded an alarm. The second control unit 404 may notify a person at the second facility 306 that it has received the alarm condition message 450; for example, the second control unit 404 may display a message on a display for the second control unit 404, create an audible alert, or otherwise provide notification.

The first control unit 402 may also be configured to receive one or more second system commands 470 from the second control unit 404. As used herein, a command refers to a communication that causes an action to occur on the first security system 310. The first control unit 402 may be configured to execute the second system commands 470 received from the second control unit 404. To continue the example above, a user at the second facility 306 may determine that the door was opened by an employee who forgot to disarm the first security system 310 before entering the first facility 302. The user may send a second system command 470 that causes the first control unit 402 to turn off the alarm at the first facility 302.

Other examples of second system commands 470 include a command that arms the first security system 310, a command that remotely locks or unlocks a door that is controlled by the first control unit 402, and a command that adjusts the thermostat of the first facility 302. Other second system commands 470 other than those listed in the above non-exhaustive list may also be beneficially implemented.

In certain embodiments, the second control unit 404 may be configured to initiate a communication session with the first control unit 402 whereby a user of the first control unit 402 can communicate with a user of the second control unit 404. In one embodiment, the communication session is a text-based communication session. In another embodiment, the communication session is an audio communication session; for example, both the first control unit 402 and the second control unit 404 may have speakers and microphones, allowing the users to speak to each other from the respective control units. In another embodiment, the communication session may be an audio-video communication session. In certain embodiments, the first control unit 402 may also be configured to allow a user to initiate a communication session with the second control unit 404.

The first control unit 402 and the second control unit 404 may automatically link in response to one or more link conditions. As used herein, a link condition refers to a condition that, if met, results in the first control unit 402 linking to the second control unit 404 such that the first security system 310 and the second security system 312 are linked. In one embodiment, the link conditions are related to time and date. For example, a link condition may specify that, at 6:00 pm on weekdays, the first control unit 402 links with the second control unit 404. Another link condition may specify that the first control unit 402 link with the second control unit 404 on weekends.

In some embodiment, the link condition may be related to the status of the first security system 310. For example, a link condition may specify that if the first security system 310 is armed, the first control unit 402 should link with the second control unit 404. Another possible link condition is that only if the first security system 310 is in an "armed (away)" status (i.e., the first security system 310 is armed and no one is within the first facility 302) will the first control unit 402 link with the second control unit 404. Other possible link conditions, other than those provided here, may also be used.

The first control unit 402 and the second control unit 404 may also automatically de-link in response to one or more de-link conditions. The first control unit 402 may de-link the first security system 310 and the second security system 312 in response to an authorized user entering the facility protected by the first security system 310 and disarming the first security system 310. Other possible de-link conditions, other than those provided here, may also be used.

The first control unit 402 and/or the second control unit 404 may be further configured to allow a user to manually link and de-link the first security system 310 and the second security system 312. The first control unit 402 and the second control unit 404 may require authorization from the user before allowing the user to manually link or de-link the first security system 310 and the second security system 312. For example, the first control unit 402 may require a user to provide a personal identification number (PIN), a password, a biometric scan, or other form of authorization.

As shown in FIG. 4, the first control unit 402 may include a first link module 422 and the second control unit 404 may include a second link module 424 to facilitate linking of the first security system 310 and the second security system 312 and to implement one or more of the functions described above. The first link module 422 and the second link module 424 may be implemented in software, firmware, hardware, or some combination thereof on the respective first control unit 402 and the second control unit 404.

While FIG. 4 illustrates two security systems, any number of security systems may be linked based upon the needs of the user. Thus, a plurality of additional security systems including additional control units, may link to the second control unit 404.

FIG. 5 illustrates an embodiment of a first security system 310 and a second security system 312 linked by a link module 502 implemented within a monitoring system 103. While FIG. 4 discussed the first control unit 402 sharing alarm condition messages 450 with the second control unit 404, not all events detected by the first sensors 412 may be alarm condition messages 450. Certain first sensors 412 in the first security system 310 may be unrelated to alarms. For example, a temperature sensor may report the ambient temperature at a location in the first facility 302 to the first control unit 402. The first control unit 402 may be configured to share sensor event messages 550 with the link module 502. A sensor event message, as used herein, refers to a communication indicating a status of a sensor 412, whether an alarm condition or other sensor condition. An alarm condition message is one type of sensor event message.

While the example discussed in connection with FIG. 4 dealt with an embodiment where only one security system provides the other security system with information and is controllable by the other security system, in certain embodiments, both security systems provide updates to each other and are controllable by the other security system. Each security system may thus share the same information with the other security system, and be controllable from the other security system. For example, the first security system 310 may be installed at a first residence and the second security system 312 may be installed at a second residence, an office, etc. The second security system 312 may receive information about the first security system 310 and provide that information to the user of the second security system 312. The first security system 312 may similarly receive information about the second security system 312 and provide that information to the user of the first security system 310. The user of the first security system 312 may control aspects of the second security system 312, and the user of the second security system 312 may control aspects of the first security system 310.

The link module 502 may link a first security system 310 installed at a user's home and a second security system 312 installed at the user's office. While at home, the user may be able to monitor the status of the second security system 312 as the second security system 312 is linked to the first security system 310 by the link module 502. The user may also be able to control one or more features of the second security system 312 from the home using the first security system 310; for example, the user may be able to arm and disarm the second security system 312 and adjust the temperature at the office. While at the office, the user may be able to similarly monitor and manage the home with the first security system 310 through the second security system 312.

The link module 502 may be configured to receive first system sensor event messages 550 generated by the first security system 310 and to receive one or more first system commands 552 of the first security system 310. The link module 502 may also receive second system sensor events 562 and one or more second system commands 560 that are generated by the second security system 312. The link module 502 may send second system sensor events 562 to the first security system 310, and send second system commands 560 of the second security system 312 to the first security system 310. Similarly, the link module 502 may send first system sensor events messages 550 and first system commands 552 to the second security system 312. The first security system 310 and the second security system 312 may be respectively configured to execute the second system commands 560 and first system commands 552 received from the link module 502.

In certain embodiments, the link module 502 may be configured to filter the first system sensor event messages 550 received from the first security system 310 such that the second security system 312 receives only a subset of the first system sensor event messages 550. The filtering may occur in the monitoring system 103 or, in other embodiments, at the first control unit 402. For example, the link module 502 may filter the first system sensor event messages 550 such that only those sensor events associated with alarm conditions are sent to the second security system 312. In one embodiment, a user can create one or more filters for the link module 502 to implement.

Figure 6:
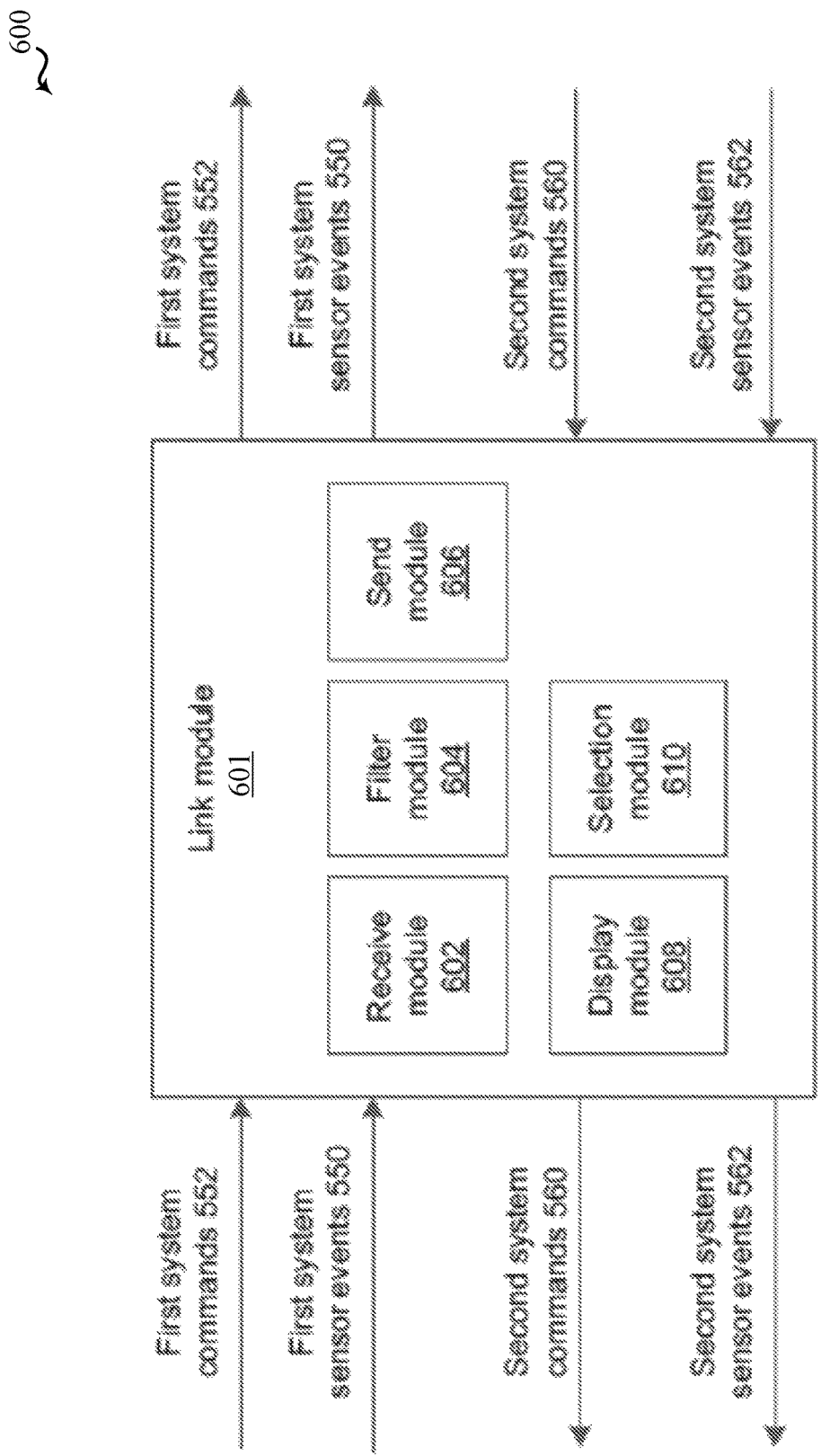
FIG. 6 is a schematic block diagram of one embodiment of a link module.

FIG. 6 illustrates one embodiment of communications 600 of a link module 601. The link module 601 may be implemented as part of the first security system 310, the second security system 312, the monitoring system 103, or distributed across the aforementioned systems. The link module 601 may implement one or more aspects of link modules 200, 422, 424, and/or 502 described above in reference to FIGS. 2, 4, and/or 5. The link module 601, in the depicted embodiment, includes a receive module 602, a filter module 604, a send module 606, a display module 608, and a selection module 610.

The receive module 602 my receive first system commands 552 and first system sensor events 550 from the first security system 310, and second system commands 560 and second system sensor events 562 from the second security system 312. Where the link module 601 is implemented as part of the monitoring system 103, the receive module 602 may receive the above communications over a network 308 as discussed above. Where the link module 601 is implemented in a first control unit 402, the receive module 602 may receive the first system commands 552 and the first system sensor events 550 over a bus; for example, the sensor monitoring module 111 discussed in connection with FIG. 1 may transmit first system sensor events 550 over a Peripheral Component Interconnect (PCI) bus. Where the link module 601 is implemented as software on the first control unit 402, the receive module 602 may receive the first system commands 552 and first system sensor events 550 through function calls or other features of an application programming interface (API).

The filter module 604 may apply one or more filter rules to communications (such as the system commands and sensor events) received by the receive module 602. The filter module 604 may apply a first set of rules for the communications received from the first security system 310 and a second set of rules for the communications received from the second security system 312. The filter module 604 may cause only a subset of the total first system sensor events 550 received by the receive module 602 to be sent to the second security system 312, and vice versa. The filter module 604 may save the filter rules in a database, table, or other suitable data structure.

The send module 606 may send the first system commands 552 and the first system sensor events 550 received by the receive module 602 to the second security system 312. The send module 606 may add additional information to the first system commands 552 and the first system sensor events 550 before sending them to the second security system 312. In certain embodiments, the send module 606 may reformat the first system commands 552 and the first system sensor events 550; for example, the receive module 602 may receive the communications according to a first protocol, and the send module 606 may reformat the communications to conform to a second protocol. The send module 606 may perform similar functions for second system commands 560 and second system sensor events 562.

Where the link module 601 is implemented on the second control unit 404, the display module 608 may display information concerning first system commands 552 and first system sensor events 550 on a display of the second control unit 404. The display module 608 may interact with the hardware, operating system, and/or application of the second control unit 404 to display information. One example of a possible display is provided in connection with FIG. 7. A link module 601 implemented on the first control unit 402 may perform similar functions for the second system commands 560 and the second system sensor events 562.

The selection module 610 may link and de-link the first security system 310 and the second security system 312. The selection module 610 may automatically link and de-link the first security system 310 and the second security system 312 in response to link conditions and de-link conditions, as described above. The selection module 610 may be further configured to allow a user to manually link and de-link the first security system 310 and the second security system 312.

In one embodiment, the selection module 610 allows the user to set up the link module 601 to provide the linking functionality described herein. For example, when setting up a link for the first time, the selection module 610 may request that the user provide a unique identifier that identifies the second security system 312. The selection module 610 may also require authentication and authorization from both the first control unit 402 and the second control unit 404 before creating an initial link. Once the selection module 610 creates the initial link, it may store the relevant addresses and information allowing the selection module 610 to automatically link and de-link the first security system 310 and the second security system 312 in the future.

Figure 7:
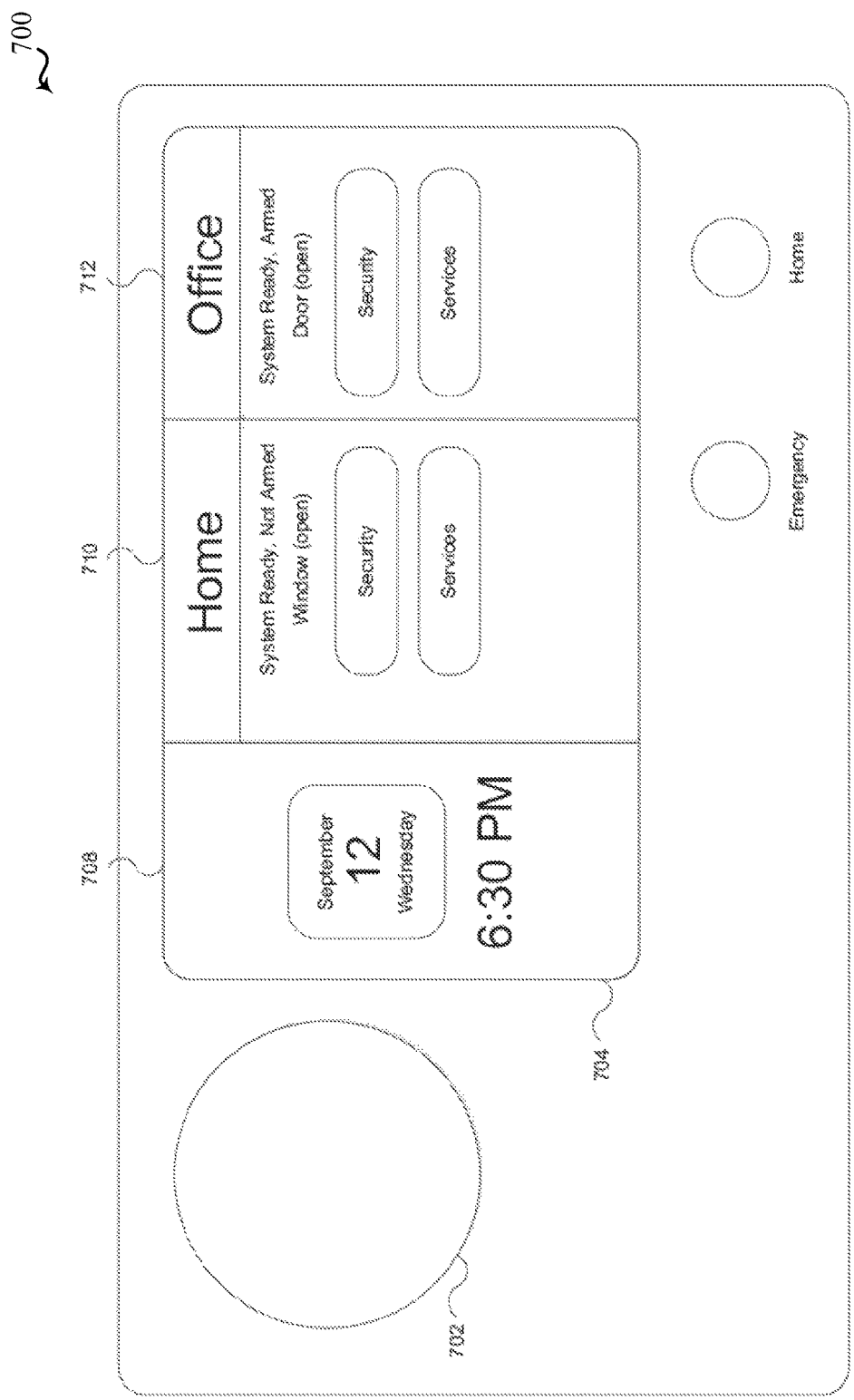
FIG. 7 is an illustration of one embodiment of a control unit for a first security system linked with a second security system.

FIG. 7 illustrates one embodiment of a control unit 700. The control unit 700, which may implement one or more aspects of control unit 102, 402, and/or 404 described above in reference to FIGS. 1, 2, 4, and/or 5, may include a speaker 702 through which audio information may be provided to a user of the control unit 700. The control unit 700 may also include a display 704 through which visual information may be provided to the user. In certain embodiments, the display 704 is a touch screen display that can receive user input.

The display 704 may be configured to show a general display area 708, a first facility display section 710, and a second facility display section 712. The general display area 708 may be an area where the control unit 700 displays general information unrelated to a particular facility; for example, the control unit 700 may display the date, time, weather, or other information in the general display area 708.

The control unit 700 may display information related to the first facility 302 in the first facility display section 710. The control unit 700 may store and display a name for the first facility 302; for example, the display name for the first facility 302 may be "Home." The first facility display section 710 may also include the status of the first security system 310 at the first facility 302. In FIG. 7, the status of the first security system 310 is "system ready, not armed." The first facility display section 710 may also display the status of one or more first sensors 412 in the first security system 310. In FIG. 7, the status of one first sensor 412 may be "Window (open)." Thus, the control unit 700 may display alarm condition messages and/or sensor event messages on the display 704.

The first facility display section 710 may also display one or more touch icons allowing the user to receive additional information about the first security system 310 and to send commands to the first security system 310. In FIG. 7, pressing the "security" icon may display a menu of security-related options for the user such as, for example, arming or disarming the first security system 310. Pressing the "services" icon may display a menu of services-related options for the user such as, for example, setting a temperature, turning lights on and off, locking doors, and other options. The control unit may thus visually differentiate between first system alarm condition messages and/or sensor event messages and second system alarm conditions and/or sensor event messages. Other configurations for displaying such information, and differentiating between the two security systems are also within the scope of the present disclosure.

The control unit 700 may also display information related to the second facility 304 in the second facility display section 712. The control unit 700 may store and display a name for the second facility 304; in FIG. 7, the name of the second facility 304 is "Office." The second facility display section 712 may include the status of the second security system 312 and the status of one or more second sensors 414. In FIG. 7, the status of the second security system 312 is "System ready, armed" and the status of a second sensor 414 is "Door (open)." The control unit 700 may provide icons (such as the "security" and "services") that allow a user to cause various security and service-related actions as described above.

In the embodiment shown in FIG. 7, the second security system 312 for the office has triggered an alarm since the second security system 312 is armed and a door is open. The second security system 312 may cause an alarm at the office, such as an audio alarm, a visual alarm, or some combination thereof. The control unit 700 may, however, be part of the first security system 310. Where the user is at the home where the control unit 700 is installed, the user is unlikely to hear or see the alarm sounding at the office.

The control unit 700 may be configured to provide an alert when the second security system 312 is in an alarm condition. For example, the control unit 700 may generate an audible alarm through the speaker 702. The control unit 700 may generate a visual alarm by changing the color of the second facility display section 712. For example, the control unit 700 may create a red, flashing background for the second facility display section 712 if an alarm condition at the second facility 304 is detected. In certain embodiments, the audible and/or the visual component of the alarm generated by the control unit 700 may differ depending on whether the alarm is for the home or the office. Such an embodiment may allow the user to quickly determine where the alarm condition exists, and whether the user is in present danger. Those of skill in the art will appreciate the various alarms that may be generated by the control unit 700.

The control unit 700 may also allow the user to review and disable the alarm for the second security system 312 from the control unit 700 for the first security system 310. The user may, for example, communicate with an individual at the second facility 304 through the control unit 700. The user may determine that an authorized individual accidentally triggered the alarm and disable the alarm at the second facility 304. The user may, in one embodiment, press the "security" icon in the second facility display section 712 to access an icon from which the user can send a command to the second security system 312 turning the alarm off and/or disarming the second security system 312. The second facility display section 712 may provide a confirmation that the alarm has turned off.

The link module 601 may re-direct communications from an operations center 304 intended for one security system to the other, or to both linked security systems. In one embodiment, the link module 601 designates one security system as the dominant security system. A user may designate the security system for whichever facility she is physically present at as the dominant security system. For example, the user may designate the second security system 312 as the dominant security system when the user is at the second facility 306, and the first security system 310 as the dominant security system when the user is at the first facility 302. Communications from the operations center 304 may be routed to the dominant security system. Thus, a security representative may attempt to communicate with a user through the control unit for the second security system 312 in response to an alarm for the second security system 312 sounding. If the first security system 310 is the dominant security system at the time of the communication, the link module 601 may route the communication to the first security system 310.

In another embodiment, the link module 601 routes communications from a security representative at the operations center 304 to both the first security system 310 and the linked second security system 312 regardless of the security system for which the communication is intended. The link module 601 may further monitor for which security system generates a response to the communication, and establish communication between the responding security system and the operations center 304.

For example, a security representative may attempt to speak with a user through the second control unit 404 for the second security system 312 in response to an alarm occurring for the second security system 312. The link module 502 may cause the communication to come through both the second control unit 404 and the first control unit 402. If the first response is through the first control unit 402, the link module 601 may route the communications from the security representative for that communication session through the first control unit 402.

In some embodiments, the display 704 of the control unit 700 may also include a video display screen (not shown) that displays video input received by the control unit 700. The video display screen may be linked to the speaker 702 such that received video and audio information may be presented to a user in a synchronized manner In some cases, the control unit 700 may receive video and audio data from a wireless device, such as mobile device, another security system, another control unit of another security system, etc.

In some embodiments, the display 704 of the control unit 700 may display video and audio data from another control unit upon the occurrence of one or more link conditions as described above. For example, upon the occurrence and/or detection of an alarm condition at second security system, the second security system may automatically link to the first security system via control unit 700. If, for example, the alarm condition is a door of the second facility being opened when the second security system is armed, the second security system may link to the first security system and send video and audio data related to the alarm condition at the second facility. For example, the data may be real-time data such that a user at control unit 700 may see a live stream of video and audio data coming from the door where the alarm condition at the second facility occurred. In other scenarios, the data may be recorded by the second security system and the recoding of the video and audio data may be transmitted to and displayed on the display 704 of the control unit 700. The operation and functionality of the video and audio communication session will be described in greater detail below in reference to FIGS. 8-12.

Figure 8:
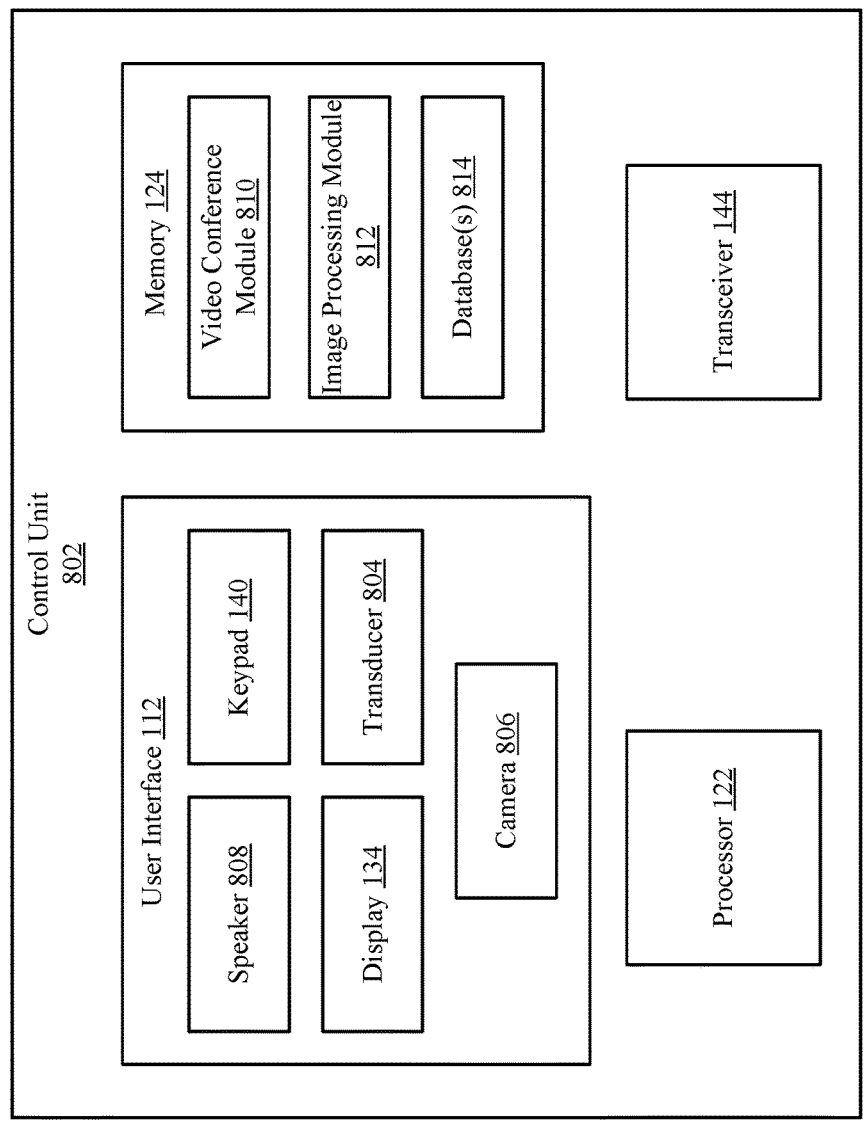
FIG. 8 is a block diagram of another embodiment of a control unit of a security system.

FIG. 8 is a block diagram of another example of a control unit 802, according to an embodiment of the present disclosure. Control unit 802 may include one or more aspects of control unit 102, 402, 404, and/or 700 described above in reference to FIGS. 1, 2, 4, 5, and/or 7. Control unit 802 may include a processor 122, memory 124, and user interface 112. User interface 112 may include various input/output (I/O) devices, such as a display 134, which may comprise a touch screen, a transducer 804, a camera 806, a keypad 140, and a speaker 808. Control unit 802 may further include a transceiver 144 for receiving and transmitting data (e.g., video, audio, images) over a network. It is noted that a "communication interface" as referred to herein may comprise transceiver 144 and user interface 112.

According to one embodiment, display 134 may be configured to display information, such as, for example, video, images, or a combination thereof. Thus, a self-contained system (i.e., control unit 802) may display audio and/or video via user interface 112. In addition, camera 806 may be configured to capture video and still images. Accordingly, events that occur near control unit 802 may be displayed via the user interface 112. Further, the captured events may be recorded for subsequent viewing. According to one embodiment, recording of events (i.e., via camera 806) may be triggered based on security system events (e.g., if a door unlocks, if a window breaks, or if the camera senses movement).

Further, transducer 804, which may comprise a microphone, may be configured to receive an audio input and convert the audio input into a electrical signal for transmission. Speaker 808 may be configured to convey an audio output.

Memory 124 may include a video conferencing module 810 and an image processing module 812, each of which may comprise hardware, software, firmware, or a combination thereof. Memory 124 may also include one or more databases 814 for storing data. In FIG. 8, video conference module 810 and image processing module 812 are illustrated as being stored in memory 124 so as to be accessible and/or executable by processor 122. However, it should be understood that video conference module 810 and image processing module 812 may be otherwise stored, even remotely.

As will be appreciated by a person having ordinary skill in the art, videoconferencing is the conduct of a videoconference (also known as a video conference or video-teleconference) by a set of telecommunication technologies which allow two or more locations to communicate by simultaneous video and audio transmissions. According to various embodiments of the present disclosure, video conferencing module 810 may be configured for establishing a video and audio communication session with at least one other electronic device, such as a control unit of another security system, a mobile device, etc. More specifically, video conference module 810 may identify a network address of a device and, thereafter establish a communication session with the device using the identified network address. Further, a communication interface, which may comprise user interface 112 and transceiver 144, may be configured for receiving and transmitting audio and video data over a network via an established communication session. It is noted that video conferencing, as described herein, is not limited to two-way conferencing. Rather, one-way, or more than two-way conferences may be within the scope of the present disclosure.

Figure 9:
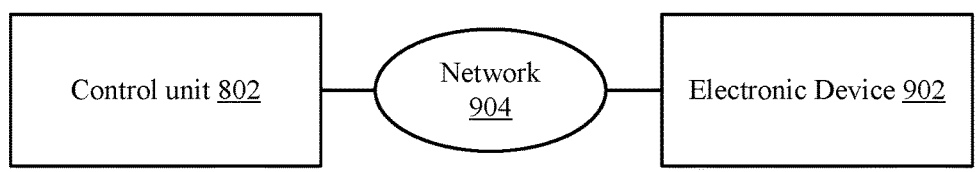
FIG. 9 is a schematic block diagram illustrating one embodiment of a system including a control unit, a network, and an electronic device.

FIG. 9 illustrates a system 900 in accordance with an embodiment of the present disclosure. System 900 comprises a control unit 802 communicatively coupled to an electronic device 902 via a communication network 904. Accordingly, as will be understood by a person having ordinary skill in the art, control unit 802 may be configured to transmit and receive video and audio content (e.g., a live video feed and/or a video message) to and from electronic device 902 via communications network 904 to enable a user of control unit 802 to communicate with a user of electronic device 902. Communications network 904 may comprise any suitable network that enables video conferencing between two or more electronic devices. For example, network 904 may comprise a local area network or a wide area network. Furthermore, it is noted that network 904 may comprise a wireless network, a wired network, or a combination thereof. Although system 900 is illustrated as only two communicatively coupled devices, the present disclosure is not so limited. Rather, control unit 802 may be communicatively coupled to any number of electronic devices via communication network 904, such as one or more control units of other security systems.

According to one embodiment, electronic device 902 may include a control unit of another security system. As such, according to one contemplated operation, a user of a first security system (e.g., at a first residence) may participate in a video conference with a user of another security system (e.g., at a second residence), such as in systems 100, 300, 400, and/or 500 described above in reference to FIGS. 1, 3, 4 , and/or 5. According to another embodiment, electronic device 902 may include a remote computing device. As a more specific example, electronic device 902 may include a personal computer or a mobile device, such as a mobile telephone. According to another embodiment, control unit 802 and electronic device 902 may exist within a single security system. Stated another way, control unit 802 may comprise a primary control panel within a security system (e.g., proximate a front door of a residence) and electronic device 902 may comprise a secondary panel of the security system (e.g., in a bedroom of the residence). In accordance with yet another embodiment, electronic device 902 may be located at a technical support center. Therefore, in this embodiment, a user of control unit 802 may receive technical support for security system 100 via a video conference with a technician.

In accordance with other various embodiments of the present disclosure, a security device, which may be part of security system 100, 300, 400, and/or 500 described above in reference to FIGS. 1, 3, 4, and/or 5, may include a camera positioned proximate an access area (e.g., near a door or a gate) and configured to capture video and/or images of an access area. The video and/or images may be communicated via a communications session with an electronic device 902, such as a control unit of another security system, for example to inform a user of the electronic device 902 of events occurring at an access area associated with control unit 802.

Figure 10:
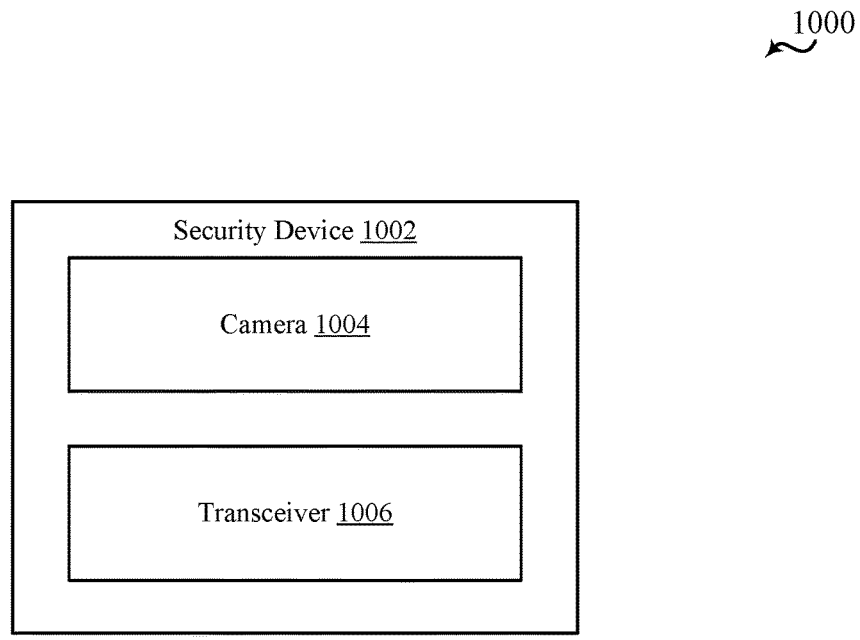
FIGS. 10 and 11 are schematic block diagrams illustrating embodiments of a security device.

With reference to FIG. 10, a block diagram 1000 of an example security device 1002 is shown. The security device 1002, which is configured to be positioned proximate an access area, may include a camera 1004 and a transceiver 1006. According to one embodiment, camera 1004 may capture video and/or still images of an access area. Further, video and/or images captured by camera 1004 may be transmitted to control unit 802 (see FIG. 9) via transceiver 1006. Upon receipt of data from transceiver 1006, control unit 802 may display the data via user interface 112, store the data within databases 814, or both. As such, a user positioned proximate user interface 112 may view the access area to determine whether to open a door for a person positioned within the access area. According to one embodiment, recording of events (i.e., via camera 1004) may triggered be based on security system events (e.g., if a door unlocks, if a window breaks, or if the camera senses movement). In addition, the video and/or images captured by camera 1004 may be communicated to a control unit 802 of another security system, for example, via the techniques described above.

Figure 11:
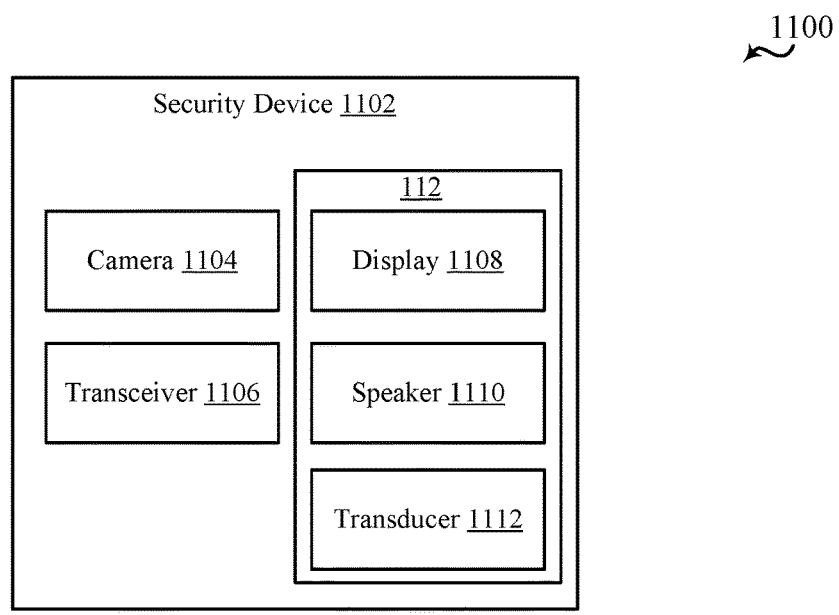

Further, with reference to FIG. 11, a block diagram 1100 of another example security device 1102 is shown. The security device 1102 may include a camera 1104, a transceiver 1106, and a user interface 112 having a display 1108, a speaker 1110, and/or a transducer 1112. As such, a user positioned proximate user interface 112 may communicate (e.g., audibly, visually, or both) with a person positioned proximate the access area.

As noted above, a camera 1104 may capture still images of an access area (e.g., an area proximate a door or a gate outside of a residence). Further, according to one embodiment, an image captured by camera 1104 may be transmitted to control unit 802 and compared to data within database 814. More specifically, a captured image may be compared to one or more images stored within database 814 to determine if a person depicted in the captured image matches an image of an authorized person. It is noted that control unit 802 may utilize image processing module 812 to identify one or more characteristics of an image. It is further noted that device 1102 may capture and transmit a plurality of images of a person positioned proximate thereto. Accordingly, upon receipt of a plurality of images of a person, image processing module 812 (see FIG. 8) may be configured to identify an optimal image of the plurality of images, compare the identified image to images of authorized persons and, depending on whether the captured image matches an image of an authorized person, grant or deny access.

According to another embodiment of the present disclosure, control unit 802 may be configured to display video, images, sound, or a combination thereof, captured from one or more cameras positioned within a security system, such as a system including aspects of systems 100, 300, 400, and/or 500 described above in reference to FIGS. 1, 3, 4, and/or 5. Therefore, in this embodiment, upon occurrence of an alarm event, a user may view and, possibly hear, via user interface 112, video, images, and/or audio captured by a camera proximate a location of the alarm event.

It is noted that according to one or more embodiments of the disclosure, a security system may include digital video recorder (DVR) functionality. For example, control unit 802 may include or may be operably coupled to a DVR. Accordingly, any video that is conveyed to, or generated at, control unit 802 may be recorded and stored at control unit 802. As a more specific example, video received via a video conference, or video captured by a camera (i.e., a camera proximate to or within control unit 802, or a camera remote from control unit 802) may be recorded via the DVR and stored within control unit 802. Further, according to other embodiments of the present disclosure, video, images, and/or audio stored within control unit 802 may be remotely played-back. Stated another way, the security system, as described herein may be configured for remote playback of media (video, images, and/or audio) stored on the panel.

Figure 12:
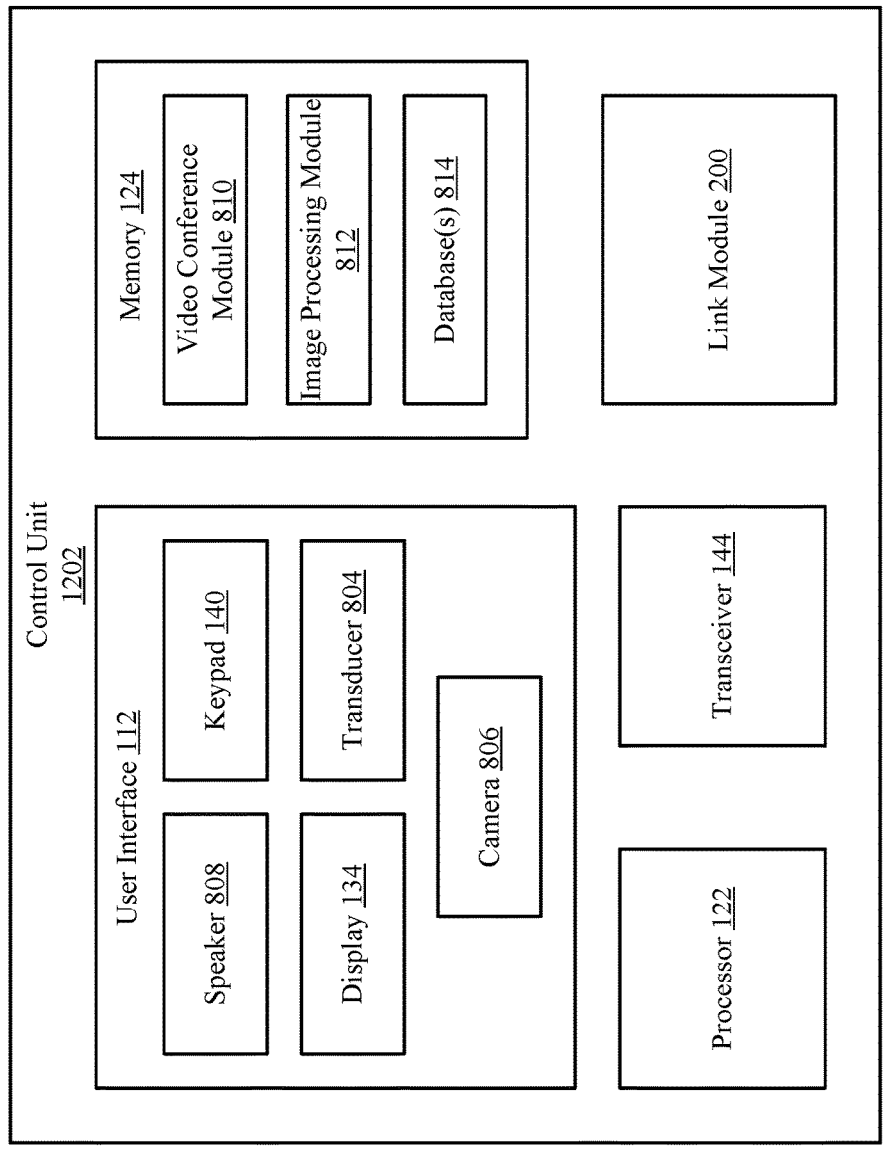
FIG. 12 is a block diagram of another embodiment of a control unit of a security system.

FIG. 12 is a block diagram of another example of a control unit 1202 according to an embodiment of the present disclosure. Control unit 1202 includes a processor 122, memory 124, a user interface 112, and a link module 200. User interface 112 includes various input/output (I/O) devices, such as a display 134, which may comprise a touch screen, a transducer 804, a camera 806, a keypad 140, and a speaker 808. Control unit 1202 may further include a transceiver 144 for receiving and transmitting data (e.g., video, audio, images) over a network. It is noted that a "communication interface" as referred to herein may comprise transceiver 144 and user interface 112.

Control unit 1202 may include one or more aspects of control unit 102, 402, 404, and/or 700 described above in reference to FIGS. 1, 2, 4, 5, and/or 7. The link module 200 of control unit 1202 may link a first security system and a second security system, such as by linking control unit 1202 to another control unit of another security system. In some embodiments, each security system can be monitored and/or controlled from the other security system. The link module 200, in conjunction with the processor 122, the user interface 112 and the memory 124, may further trigger the establishment of a video and audio communication session with another security device, such as device 902, 1002, and/or 1202 described in reference to FIGS. 9, 10, and/or 11, another security system, another control unit of another security system, etc. In some aspects, the establishment of the video and audio communication session may be triggered when the link module 200 automatically establishes a link with another security system based on the occurrence of one or more link conditions. The video and audio session may further be automatically terminated when the link module 200 automatically de-links the first and second security systems upon the occurrence of one or more de-link conditions.

Figure 13:
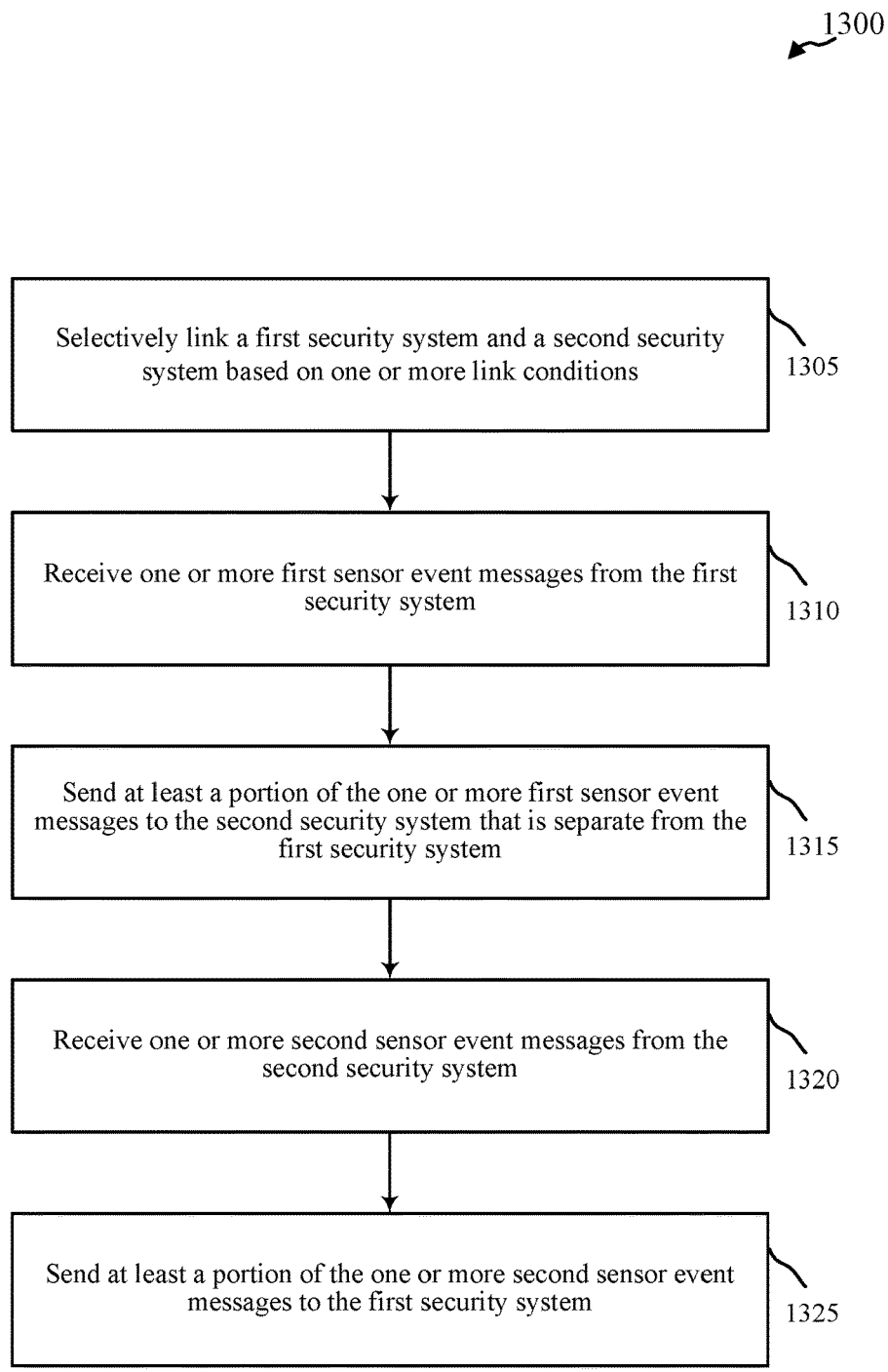
FIG. 13 is a flow chart diagram illustrating one embodiment of a method for linking security systems.

FIG. 13 illustrates one embodiment of a method 1300 for linking two security systems. The method 1300 may include selectively linking a first security system and a second security system based on one or more link conditions at block 1305. The one or more link conditions may include a time of day or predetermined schedule, a change in the armed or active status of the first security system, etc. In some embodiments, the one or more link conditions may be determined and configured by a user of at least one of the first and second security systems.

The method may further include, at block 1310, receiving one or more first sensor event messages from a first security system (e.g., 310) and sending, at block 1315, at least a portion of the first sensor event messages to a second security system (e.g., 312) that is separate from the first security system (e.g. 310). In some embodiments, a link module, such as first and/or second link modules 422, 424 implemented in a first control unit 402 and/or a second control unit 404, or a link module 502, 601 implemented in a monitoring system 103 may perform the steps 1305, 1310, and/or 1315.

The method 1300 may further include, at reference numeral 1320, receiving one or more second sensor event messages from the second security system (e.g., 312) and sending, at reference numeral 1325, at least a portion of the second sensor event messages to the first security system (e.g., 310). In some embodiments, the link module 502, 601 may perform the steps 1320 and/or 1325.

In some embodiments, the method 1300 may also include selectively de-linking the first security system and the second security system based on one or more de-link conditions. The one or more de-link conditions may include a disarming event at one of the first and second security systems, for example. In some embodiments, the one or more de-link conditions may be determined and configured by a user of at least one of the first and second security systems.

In other embodiments, the method 1300 may also include displaying on a second control unit (e.g., 404)for the second security system (e.g., 312) at least a portion of the first sensor event messages received from the first security system (e.g., 310). Similarly, the method 1300 may involve displaying on the first control unit (e.g., 402) for the first security system (e.g., 310) at least a portion of the one or more second sensor event messages received from the second security system (e.g., 312). The method 1300 may further involve sending first commands for the second security system (e.g., 312), which first commands originated with the first security system (e.g., 310), to the second security system (e.g., 312).

In some embodiments, method 1300 may further include establishing a video and audio communication session between the first and second security systems. Establishing the video and audio communications session may be performed between a first control unit (e.g., 402) of the first security system (e.g., 310) and a second control unit (e.g., 404) of the second security system (e.g., 312). The established video and audio communication session may enable a first user of the second control unit to communicate with a second user of the first control unit. The video and audio communication session may be automatically established upon the first and second security systems selectively linking in response to one or more link conditions. In some embodiments, the video and audio communication session may be automatically terminated upon the first and second security systems selectively de-linking in response to one or more delink conditions.

Although the foregoing description contains many specifics, these should not be construed as limiting the scope of the disclosure or of any of the appended claims, but merely as providing information pertinent to some specific embodiments that may fall within the scopes of the disclosure and the appended claims. Features from different embodiments may be employed in combination. In addition, other embodiments of the disclosure may also be devised which lie within the scopes of the disclosure and the appended claims. The scope of the disclosure is, therefore, indicated and limited only by the appended claims and their legal equivalents. All additions, deletions and modifications to the disclosure, as disclosed herein, that fall within the meaning and scopes of the claims are to be embraced by the claims.

What is claimed:

1. A security system comprising:
   a first security system comprising a first control unit and a first sensor communicatively connected to the first control unit; and
   a second security system comprising a second control unit and a second sensor; wherein the first control unit and the second control unit are configured to link based on an occurrence of a link condition that is associated with an armed status of the first security system or the second security system.

2. The security system of claim 1, wherein the second control unit is configured to link to the first control unit upon the occurrence of the link condition such that one or more second system alarm condition messages for alarm conditions detected by the second sensor are available through the first control unit.

3. The security system of claim 2, wherein the first control unit is configured to direct the second security system to execute at least one command based on the one or more second system alarm condition messages.

4. The security system of claim 1, wherein the second control unit is configured to direct the first security system to execute at least one command based on a first system alarm condition message.

5. The security system of claim 1, wherein the first control unit is configured to wirelessly transmit first system alarm condition messages to the second control unit.

6. The security system of claim 5, wherein the first control unit is configured to send the first system alarm condition messages to a remote monitoring system, and wherein the second security system retrieves the first system alarm condition messages from the remote monitoring system.

7. The security system of claim 5, wherein the first control unit is configured to filter the first system alarm condition messages based on a category associated with each of the first system alarm condition messages.

8. The security system of claim 7, wherein the first control unit is configured to transmit the filtered first alarm condition messages to the second control unit.

9. The security system of claim 1, wherein the second control unit further comprises:
   a conference component configured to establish a communication session with an electronic device; and
   a communication interface for receiving and transmitting audio data, or video data, or both over a wireless network based on the established communication session.

10. The security system of claim 9, wherein the electronic device comprises the first control unit, and wherein the established communication session enables a first user of the first control unit to communicate with a second user of the second control unit.

11. The security system of claim 1, wherein the link condition further comprises a predefined date, a determination that a user has exited a property monitored by the first security system or the second security system, or a combination thereof.

12. The security system of claim 1, wherein the second sensor is communicatively connected to the first control unit.

13. The security system of claim 1, wherein the first control unit is configured to de-link with the second control unit upon the occurrence of a de-link condition.

14. The security system of claim 1, wherein a first system alarm condition message based on a condition detected by the first sensor is available through the second control unit.

15. A link module that links a first security system and a second security system, the link module configured to:
  selectively link the first security system and the second security system based on a link condition associated with an armed status of the first security system, or the second security system, or both;
  receive one or more first sensor event messages generated by the first security system from the first security system; and
  transmit one or more second sensor event messages generated by the second security system to the first security system.

16. The link module of claim 15, further configured to:
  receive a first system command generated by the first security system based at least in part on linking the first security system and the second security system; and
  transmit a second system command generated by the second security system for the first security system.

17. The link module of claim 15, further configured to selectively de-link the first security system and the second security system based on one or more de-link conditions.

18. The link module of claim 15, wherein the link module is implemented in at least one of a first control unit for the first security system, a second control unit for the second security system, or a monitoring system associated with the first security system and the second security system.

19. The link module of claim 15, further configured to:
  filter the one or more first sensor event messages received from the first security system; and
  transmit a subset of the one or more first sensor event messages to the second security system based at least in part on the filtering.

20. A method comprising:
  selectively linking a first security system and a second security system based on a link condition associated with an armed status of the first security system, or the second security system, or both;
  receiving one or more first sensor event messages generated by the first security system from the first security system; and
  transmitting one or more second sensor event messages generated by the second security system to the first security system.

* * * * *